US009618757B2

(12) United States Patent
Otsubo

(10) Patent No.: US 9,618,757 B2
(45) Date of Patent: Apr. 11, 2017

(54) STEREOSCOPIC IMAGE DISPLAY DEVICE AND STEREOSCOPIC IMAGE DISPLAY METHOD

(71) Applicant: ASUKANET COMPANY, LTD., Hiroshima-shi, Hiroshima (JP)

(72) Inventor: Makoto Otsubo, Hiroshima (JP)

(73) Assignee: ASUKANET COMPANY, LTD., Hiroshima-shi (JP)

( * ) Notice: Subject to any disclaimer, the term of this patent is extended or adjusted under 35 U.S.C. 154(b) by 0 days.

(21) Appl. No.: 14/354,093

(22) PCT Filed: Jul. 24, 2013

(86) PCT No.: PCT/JP2013/070065
§ 371 (c)(1),
(2) Date: Apr. 24, 2014

(87) PCT Pub. No.: WO2014/174693
PCT Pub. Date: Oct. 30, 2014

(65) Prior Publication Data
US 2016/0033776 A1   Feb. 4, 2016

(30) Foreign Application Priority Data

Apr. 24, 2013  (JP) ................................. 2013-091400

(51) Int. Cl.
*G02B 27/22* (2006.01)
*H04N 13/04* (2006.01)
(Continued)

(52) U.S. Cl.
CPC ......... *G02B 27/2214* (2013.01); *G02B 5/124* (2013.01); *G02B 5/13* (2013.01); *G02B 27/2235* (2013.01); *H04N 13/0443* (2013.01)

(58) Field of Classification Search
CPC .......... G02B 5/12; G02B 5/122; G02B 5/124; G02B 5/126; G02B 5/128; G02B 5/13;
(Continued)

(56) References Cited

U.S. PATENT DOCUMENTS 4,231,830 A * 11/1980 Ryan ....................... B29C 70/64
156/232
5,122,902 A * 6/1992 Benson ................... G02B 5/124
359/529
(Continued)

FOREIGN PATENT DOCUMENTS

CN    101680976 A    3/2010
CN    101765798 A    6/2010
(Continued)

OTHER PUBLICATIONS

Griffiths, "Introduction to Electrodynamics, Second Edition", 1989, Englewood Cliffs, New Jersey, Prentice Hall, pp. 361-368.*
(Continued)

*Primary Examiner* — Thomas K Pham
*Assistant Examiner* — Cara Rakowski
(74) *Attorney, Agent, or Firm* — Westerman, Hattori, Daniels & Adrian, LLP

(57) ABSTRACT

Using a stereoscopic image display device 10 formed by arranging plural cubic corner bodies 12 in a plane state such that shaft centers thereof are parallel to each other, each of the bodies 12 having three reflective planes 17-19 perpendicular to each other and a reflected light outlet 11 a provided at a corner of the planes 17-19, and placing a half mirror 14 on a light entrance plane of the bodies 12, an image is formed by letting a light from an object 26 in the light entrance plane of the bodies 12 and recursively reflecting the light off the bodies 12; and reflecting the recursively reflected light off the half mirror 14 and letting the light out
(Continued)

from the reflected light outlet 11*a* to outside. Accordingly, a stereoscopic image, i.e., a real image of the object can be observed when the device 10 is viewed from a front side.

3 Claims, 5 Drawing Sheets

(51) Int. Cl.
 *G02B 5/13* (2006.01)
 *G02B 5/124* (2006.01)
(58) Field of Classification Search
 CPC .... G02B 5/136; G02B 5/045; G02B 27/2214; G02B 27/24; G02B 27/2235; G02B 27/225
 See application file for complete search history.

(56) References Cited

U.S. PATENT DOCUMENTS

| | | | |
|---|---|---|---|
| 8,434,872 B2 | 5/2013 | Maekawa | |
| 2006/0262411 A1* | 11/2006 | Dunn | B44F 1/10 359/619 |
| 2007/0159696 A1* | 7/2007 | Koizumi | G02B 5/124 359/530 |
| 2009/0097114 A1* | 4/2009 | Mimura | G02B 5/128 359/463 |
| 2010/0177402 A1 | 7/2010 | Maekawa | |
| 2010/0214394 A1 | 8/2010 | Maekawa | |
| 2011/0181949 A1 | 7/2011 | Hashikawa | |
| 2012/0176772 A1 | 7/2012 | Maekawa et al. | |

FOREIGN PATENT DOCUMENTS

| | | |
|---|---|---|
| CN | 101868751 A | 10/2010 |
| CN | 102200599 A | 9/2011 |
| EP | 2192435 A1 | 6/2010 |
| JP | 2009-75483 A | 4/2009 |
| JP | 2009-300623 A | 12/2009 |
| JP | 2010-190960 A | 9/2010 |
| JP | 2012-128454 A | 7/2012 |
| JP | 2012-137779 A | 7/2012 |
| JP | 2012-163701 A | 8/2012 |
| JP | 2012-177922 A | 9/2012 |
| JP | 2013-73204 A | 4/2013 |
| TW | 201109741 A1 | 3/2011 |
| WO | 2009/038173 A1 | 3/2009 |
| WO | 2009/131128 A1 | 10/2009 |
| WO | 2009/136578 A1 | 11/2009 |

OTHER PUBLICATIONS

Office Action dated Dec. 18, 2014, issued in corresponding Taiwanese Application No. 103109094.(3 pages).

* cited by examiner

STEREOSCOPIC IMAGE DISPLAY DEVICE AND STEREOSCOPIC IMAGE DISPLAY METHOD

TECHNICAL FIELD

The present invention relates to a stereoscopic image display device and a stereoscopic image display method, using a corner cube having three planes of a cube (hereinafter referred to as a cubic corner body) or a spherical body.

BACKGROUND ART

Conventionally, as a stereoscopic image display device and a stereoscopic image display method, an stereoscopic image display device disclosed in Patent Literature 1, and an optical image display device and an optical image display method disclosed in Patent Literature 2 are known. In a technique disclosed in Patent Literature 1, a plurality of cubic mirrors are arranged in a grid, a light reflected off one plane of each of the cubic mirrors is further reflected off an orthogonal plane of the cubic mirrors, thereby forming a stereoscopic image as a real image on a plane on the side opposite to the display device.

As shown in FIG. 5, an optical image display device 60 disclosed in Patent Literature 2 includes first and second optical control parts 65 and 66 having a plurality of strip-shaped reflective planes 63 and 64, front and back sides of which are perpendicular to each other. The first and second optical control parts 65 and 66 are arranged in a way that each of the reflective planes 63 and 64 are perpendicular to each other. Thereby, a stereoscopic image 67 placed on one side of the front and back sides is formed on the other side as a real image 68.

CITATION LIST

Patent Literature

Patent Literature 1: Japanese Unexamined Patent Application Publication No. 2009-300623
Patent Literature 2: International Patent Application Publication No. WO2009/131128

SUMMARY OF INVENTION

Technical Problem

The optical image display device 60 disclosed in Patent Literature 2 (as well as the display device disclosed in Patent Literature 1) has a basic principle that the real image 68 corresponding to the stereoscopic image 67 is formed in a direction diagonal to the front and back sides by arranging the stereoscopic image 67 in a direction diagonal to the front and back sides and letting a light from the stereoscopic image 67 therein. Thus, it is difficult to form a real image of a stereoscopic image placed in front of (facing to) the front and back sides of the optical image display device 60.

Obviously, a position where a real image is formed can be changed by placing a mirror and the like. However, this makes a configuration of the device complicated and also makes a thickness of the whole device thick.

The present invention has been made in view of the above circumstances and it is an object of the present invention to provide a stereoscopic image display device and a stereoscopic image display method, which can form a real image of an object to be observed when viewed from a front side of the device.

Solution to Problem

To accomplish the above object, a first aspect of the present invention provides a stereoscopic image display device, comprising: a recursive reflective material including a reflected light outlet, through the reflected light outlet a light passes out from a front side to a back side thereof; and a half mirror placed on a light entrance side of the recursive reflective material; wherein a light from an object reflected off the recursive reflective material is reflected off the half mirror to change an image location.

A second aspect of the present invention provides the stereoscopic image display device as defined in claim 1, wherein the recursive reflective material is formed by spherical bodies arranged in a plane state.

A third aspect of the present invention provides the stereoscopic image display device as defined in claim 1, wherein the recursive reflective material includes three reflective planes perpendicular to each other, the recursive reflective material is formed by a plurality of cubic corner bodies each having the reflected light outlet at a corner of the three reflective planes in a way that shaft centers of the cubic corner bodies are arranged in parallel to each other, and the half mirror is placed on the recursive reflective material.

In the stereoscopic image display device according to the third aspect of the present invention, it is preferable that the reflected light outlet is formed by truncating a corner of the cubic corner body to a predetermined height level. In this case, provided that a height of the cubic corner body is h with reference to a corner of the cubic corner body, it is preferable that the reflected light outlet is formed in a height range of (0.3-0.8) h from the corner.

In the stereoscopic image display device according to the third aspect of the present invention, it is preferable that the cubic corner body is made of transparent plastic or glass, and the three reflective planes are mirror-finished.

A fourth aspect of the present invention provides a method of displaying a stereoscopic image, comprising: using a stereoscopic image display device formed by arranging a plurality of cubic corner bodies in a plane state such that shaft centers of the cubic corner bodies are parallel to each other, each of the cubic corner bodies having three reflective planes perpendicular to each other and a reflected light outlet provided at a corner of the three reflective planes, and placing a half mirror on a light entrance plane of the cubic corner bodies; letting a light from an object in the light entrance plane of the cubic corner bodies and recursively reflecting the light off the cubic corner bodies; and reflecting the recursively reflected light off the half mirror and letting the light out from the reflected light outlet to outside to form an image.

Advantageous Effects of Invention

In the stereoscopic image display device and the stereoscopic image display method according to the present invention, for example, a light from an object (including a photogenic subject and a light source) is reflected off a recursive reflective material in a incident direction and further reflected off a half mirror. Thereby, the object (e.g., a stereoscopic model) placed on a vertical position on one side of the stereoscopic image display device can be formed on a vertical position on the other side of the stereoscopic image display device as a real image.

For this reason, the real image of the object can be observed when the stereoscopic image display device is viewed from a front side thereof, allowing the whole device to be made thinner.

Particularly, in the present invention, an image of an object (including a virtual image by electric signals, etc.) placed on a back side of the stereoscopic image display device can be formed on a front side of the stereoscopic image display device, so that the present invention can be easily utilized for, for example, a display of a mobile phone or the like.

DESCRIPTION OF EMBODIMENTS

Referring to the accompanying drawings, embodiments of the present invention will be described.

Figure 1A:
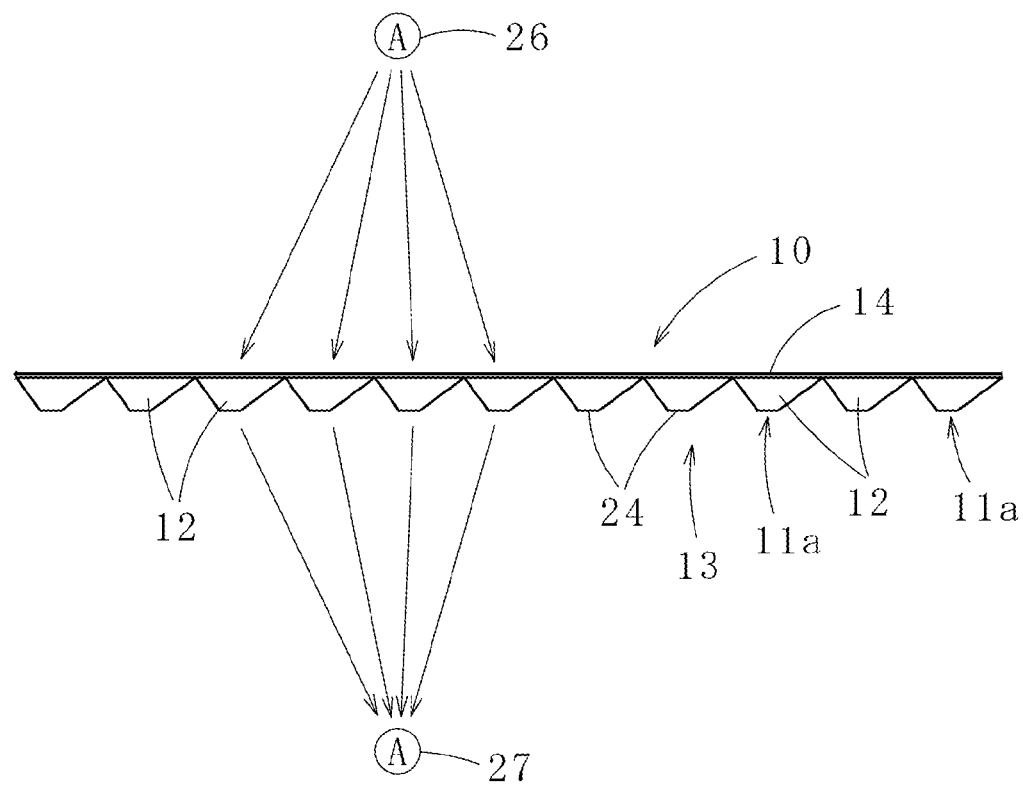
FIG. 1(A) is a cross-sectional view of a stereoscopic image display device according to one embodiment of the present invention.
Figure 1B:
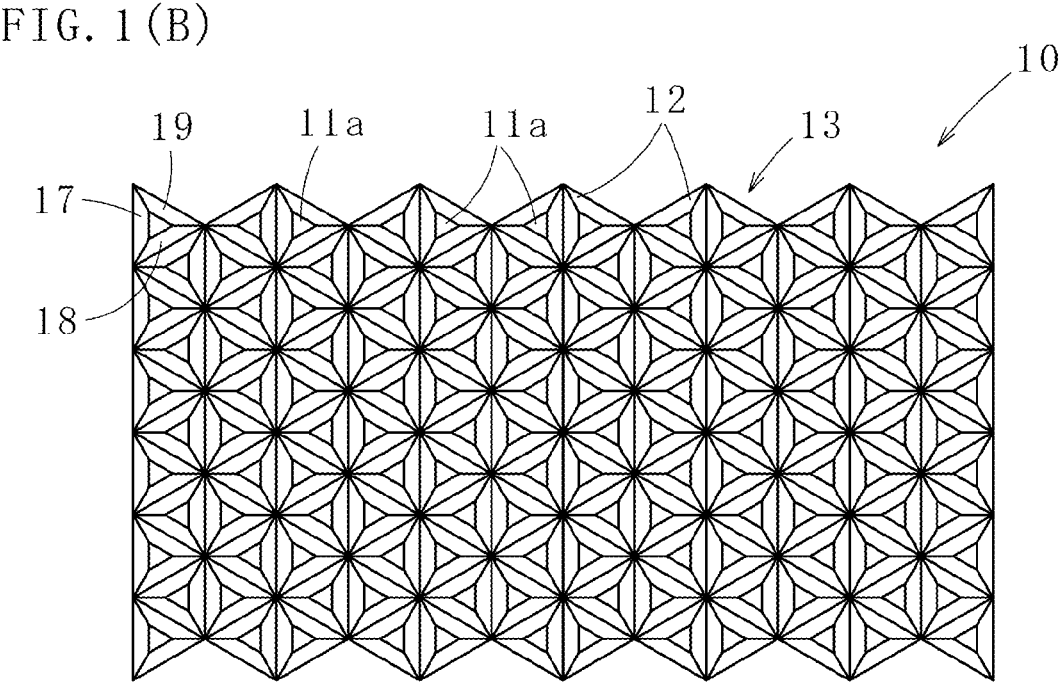
FIG. 1(B) is a bottom view of the stereoscopic image display device.
Figure 2A:
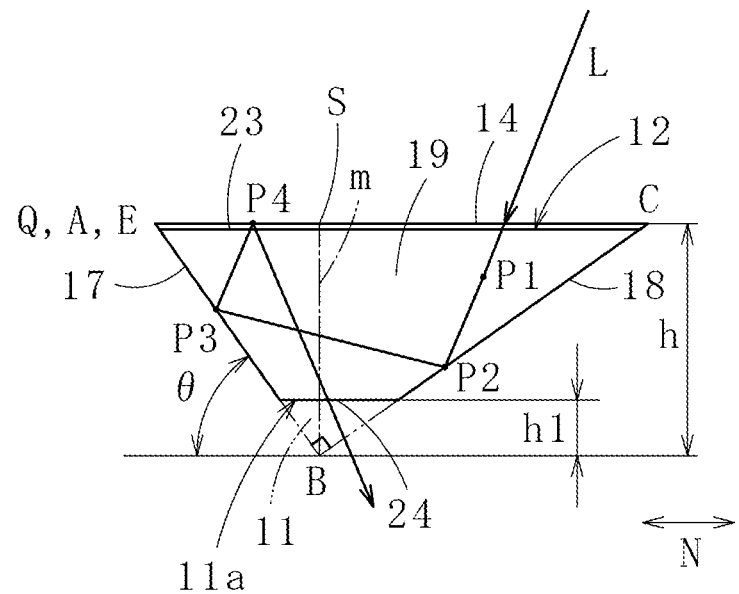
FIG. 2(A) is a side view showing a principle of the stereoscopic image display device.

As shown in FIGS. 1(A), 1(B), and 2(A), a stereoscopic image display device 10 according to an embodiment of the present invention includes an optical control (photoregulation) part 13 and a half mirror 14. The optical control part 13 includes a plurality of cubic corner bodies 12 adjoiningly arranged without gaps and each top 11 of the cubic corner bodies 12 is truncated to form a reflected light outlet 11a. The half mirror 14 is placed at a light entrance side of the optical control part 13. The cubic corner body 12 is known and described as a corner cube that is commonly used as a recursive reflective material (retroreflector). Also, the reflected light outlet 11a has a structure in which lights penetrate through the cubic corner body 12 from a front side to a back side thereof.

Figure 2B:
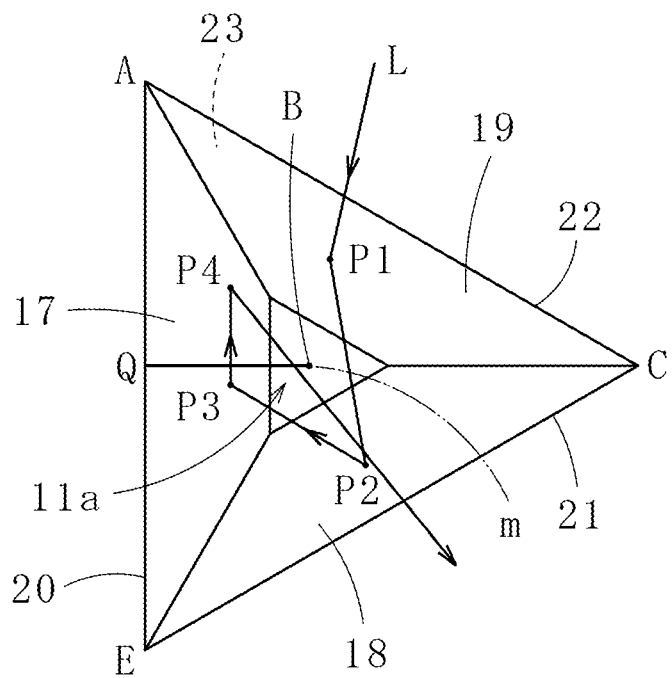
FIG. 2(B) is a plane view of the stereoscopic image display device.
Figure 3:
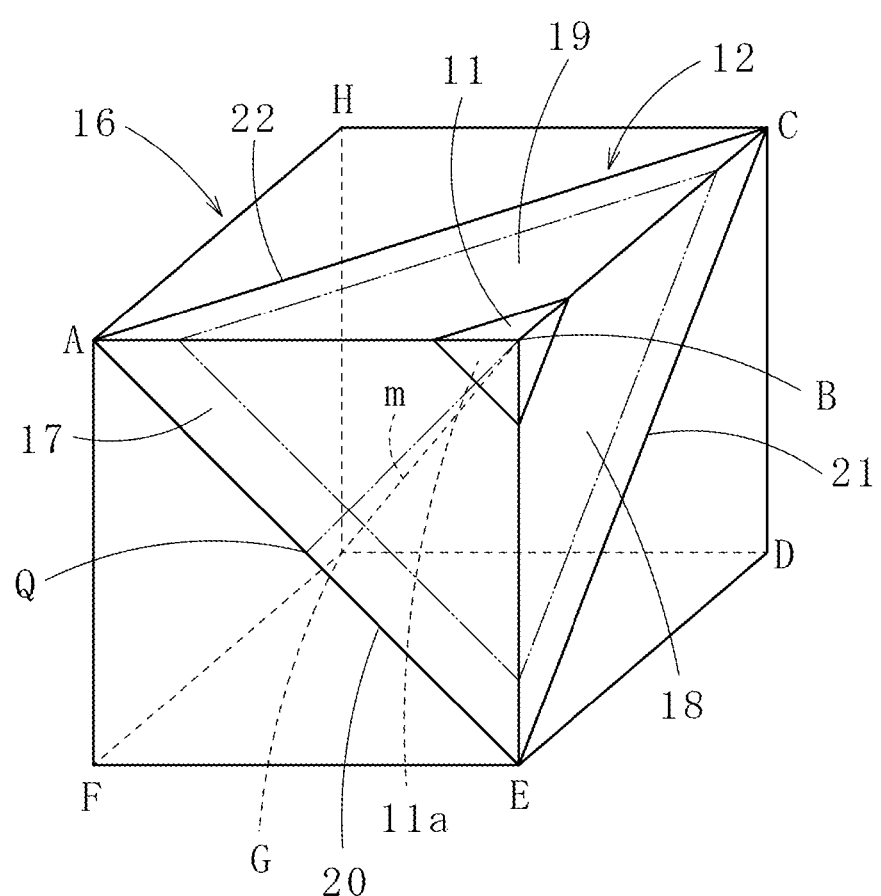
FIG. 3 is a perspective view showing a method of forming the stereoscopic image display device.

The cubic corner body 12 is mainly a transparent body made of glass or plastic. As shown in FIGS. 2(A), 2(B), and 3, the cubic corner body 12 includes three planes (reflecting planes) 17 to 19 of a cube 16, in which the planes 17 to 19 are perpendicular to each other. The top 11 of isosceles right triangles of the three planes 17 to 19 is truncated horizontally at a constant height h1 (FIG. 2(A)). Thus, the cubic corner body 12 includes the three planes 17 to 19 each having an isosceles trapezoid shape, a regular triangle 23 bounded by bases (or top lines) 20 to 22 of the three planes 17 to 19, and a top plane 24.

In FIG. 3, corners of the cube 16 are denoted by reference signs A to H, and an explanation will be given referring to the drawing. Provided that a length of one side of the cube 16 is a and a midpoint of AE is Q, the following equations are obtained: $AQ=a/\sqrt{2}$; $QC=a*\sqrt{(3/2)}$; $QB=a/\sqrt{2}$; and $\cos\theta=QB/QC=1/\sqrt{3}$. Thus, when a centerline m vertically extends from an apex angle B of the cubic corner body 12, each slope $\theta$ of the planes 17 to 19 toward a horizontal plane N is $\arccos(1/\sqrt{3}) \approx 54.736$ degrees.

The cubic corner body 12 with the vertically-extended centerline m has a regular triangle shape when viewed from the above. Accordingly, as shown in FIG. 1(B), a plurality of the cubic corner bodies 12 are arranged in a planar state without gaps while the centerlines m are aligned parallel to each other. In this case, as shown in FIG. 2(A), the top 11 of the cubic corner body 12 is eliminated at the level of the height h1 to form the top plane 24 perpendicular to the centerline m. The top plane 24 in this embodiment is the reflected light outlet 11a through which lights penetrate from front to back sides thereof. Furthermore, external sides of the planes 17 to 19 of the cubic corner body 12 are mirror finished (are not half mirrors). With these features, the optical control part 13 functions as a recursive reflective material in which an angle of an incident light and an angle of a reflected light are equal.

The cutting height h1 to form the top plane 24 is preferably 0.3-0.8 times (more preferably 0.35-0.5 times) a height h (BS) with reference to a corner B of the cubic corner body 12 set by vertically aligning the centerline m. If the height h1 is increased, a reflective area of the cubic corner body 12 is reduced. If the height h1 is decreased, a reflected light is reduced and thus an amount of light of a real image formed is insufficient.

A plurality of the cubic corner bodies 12 of the above-described conditions are arranged to form the optical control part 13. The light entrance side of the optical control part 13 in a plane state forms a light entrance plane, and the half mirror 14 is formed thereon. In this case, it is preferable that a light transmission rate of the half mirror 14 is set to 20-80% (more preferably 40-70%). A light from an object 26 (including a planar or tridimensional display image) enters the optical control part 13 via the half mirror 14 and reflects at the same angle, reflects off an internal side of the half mirror 14, passes out through the reflected light outlet 11a, and then a real image is formed at an external side of the stereoscopic image display device 10.

It is possible to form a half mirror directly on the light entrance side of the cubic corner bodies 12. It is also possible to form a half mirror on a front side or a back side of a transparent plate placed on the light entrance side of the cubic corner bodies 12.

In addition, it is possible to form the optical control part 13 with a plurality of the cubic corner bodies 12 by metal molding, and at the same time to form the translucent top plane 24 having a regular triangle shape when viewed from a bottom by making parts joining light entrance surfaces transparent, forming a half mirror on a front surface of the optical control part 13 being an intermediate material, and mirror-finishing a slant plane of a back side. Furthermore, the top plane 24 can be formed by horizontally cutting a top of an original cubic corner body, a back side of which is mirror finished.

Now, descriptions will be given on a performance of the stereoscopic image display device 10 and a method of displaying a stereoscopic image according to an embodiment of the present invention.

Figure 4:
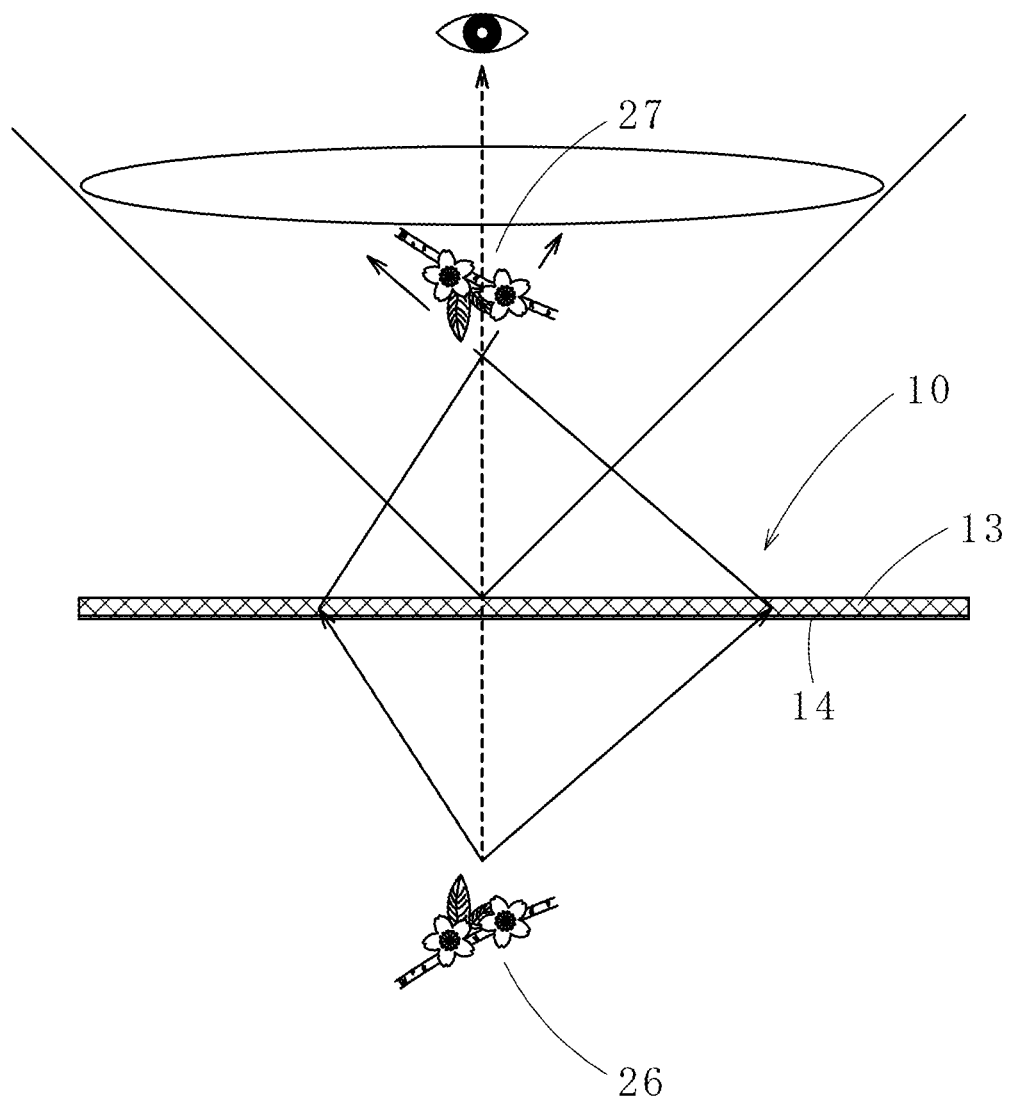
FIG. 4 is an explanatory diagram showing operations of a stereoscopic image display device according to one embodiment of the present invention.
Figure 5:
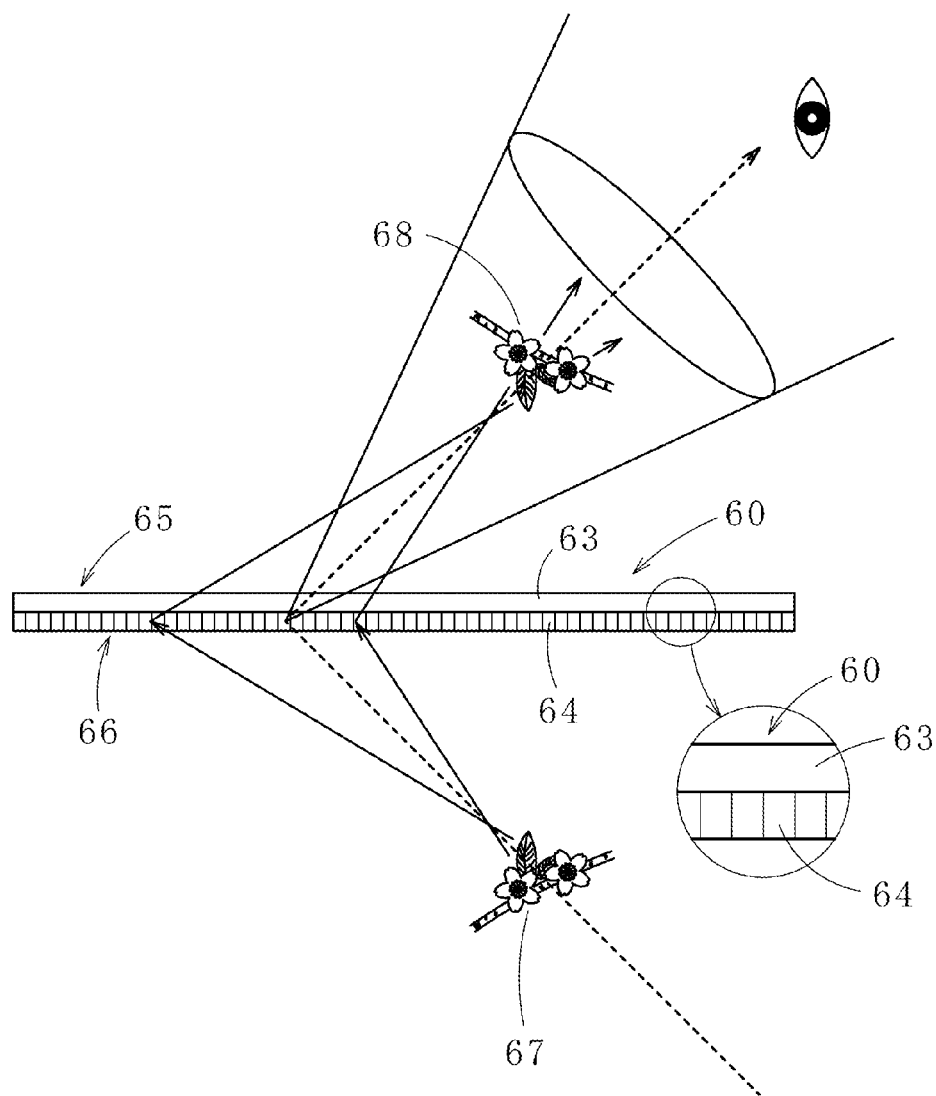
FIG. 5 is an explanatory diagram of a stereoscopic image display device according to a conventional example.

If the object 26 is placed with a constant distance on the front side of the stereoscopic image display device 10 having the above-described configurations as shown in FIGS. 1 and 4, a light from the object 26 passes through the half mirror 14 and then enters the optical control part 13. Since the optical control part 13 is the recursive reflective material, a light (i.e., a recursive reflected light) is reflected at the recursive reflective material in an incident direction via the three planes 17 to 19 and the light reaches to the half mirror 14. Specifically, a light L from the object 26 proceeds as follows: 1) passes through the half mirror 14; 2) reflects at a point P1 of the plane 19; 3) reflects at a point P2 of the plane 18; and 4) reflects at a point P3 of the plane 17. The reflected light at the point P3 of the plane 17 is parallel with the light L, reflects at a point P4 of the half mirror 14 and passes out through the reflected light outlet 11a to form an image.

Although a part of light transmits through the half mirror 14, the rest of the light reflects at the half mirror 14 and passes out through the reflected light outlet 11a downwardly (to outside) as shown in FIG. 1 to form a real image (stereoimage) 27. The real image 27 in this case becomes bright in theory with a higher reflective rate of the half mirror 14 and a wider dimension of the reflected light outlet 11a. However, if the reflective rate of the half mirror 14 is increased, a light from the object 26 is decreased. Also, if the dimension of the reflected light outlet 11a is increased, the function of the recursive reflective material is reduced. For this reason, it is preferable to set the transmission rate of the half mirror 14 close to 40-60%. It is also preferable to set the dimension of the reflected light outlet 11a to 20-36% of a dimension of the regular triangle 23. Here, the dimension is proportionate to the square of the height h1.

In the above-described embodiments, the cubic corner body 12 is used as the recursive reflective material. However, it is theoretically possible to form a real image by using a recursive reflective material with a plurality of transparent balls (spherical bodies) arranged in a plane state instead of using the optical control part 13 formed by a group of the cubic corner bodies 12, placing a half mirror at a light entrance side of the recursive reflective material, and reflecting a light reflected from the balls at the half mirror. In this case, spaces between the transparent balls serve as reflected light outlets through which the reflected light from the half mirror passes out. Also, when the balls (spherical bodies) are arranged in a plane state, a dimension of the reflected light outlets is approximately 0.1 times a whole dimension. However, it is preferable to increase an effective area of the reflected light outlets by providing little gaps between the balls. In addition, if needed, it is possible to eliminate a top of the ball partially.

The present invention is not limited to the above-described embodiments, but can include modifications within a scope of the present invention.

INDUSTRIAL APPLICABILITY

In the stereoscopic image display device according to the present invention, a real image of an object can be observed on front side of the stereoscopic image display device when the stereoscopic image display device is viewed from a front side, which can make the whole device thinner. Particularly, if the present invention is applied to a display for a mobile phone or a personal computer, it is not necessary to decline the stereoscopic image display device as needed in conventional examples, thereby improving conveniences.

REFERENCE SIGNS LIST

10: stereoscopic image display device, 11: top, 11a: reflected light outlet, 12: cubic corner body, 13: optical control part, 14: half mirror, 16: cube, 17-19: plane, 20-22: base, 23: regular triangle, 24: top plane, 26: object, 27: real image

The invention claimed is:

1. A stereoscopic image display device, comprising:
a recursive reflective material including a reflected light outlet, through the reflected light outlet light passes out from a front side to a back side thereof; and
a half mirror whose transmission rate is set to 40-70% placed on a light entrance side of the recursive reflective material; wherein
the recursive reflective material is formed by arranging a large number of cubic corner bodies in a way that shaft centers of the cubic corner bodies are arranged in parallel to each other, the cubic corner bodies each having the reflected light outlet at a top portion of a truncated triangular pyramid formed by truncating an apex portion of a triangular pyramid having three side planes each formed from an isosceles right triangle,
provided that a height along a centerline m in the triangular pyramid having the apex portion thereof untruncated is h, the reflected light outlet of each of the cubic corner bodies is located in a range of (0.3 to 0.8)·h from an apex corner of the triangular pyramid, and
by means of the recursive reflective material and the half mirror, light from an object is let in the recursive reflective material through the half mirror, the light having reflected off the recursive reflective material is reflected off the half mirror, reflected light from the half mirror is let out from the reflected light outlet to outside, and an image location is changed and a real image is formed on a back side of the recursive reflective material.

2. The stereoscopic image display device as defined in claim 1, wherein the cubic corner bodies are made of transparent glass, and three reflective planes of each of the cubic corner bodies are mirror-finished.

3. A method of displaying a stereoscopic image by using the stereoscopic image display device as defined in claim 1, comprising:
letting light from an object in the cubic corner bodies through the half mirror and recursively reflecting the light off the cubic corner bodies; and
reflecting the recursively reflected light off the half mirror and letting the light out from the reflected light outlet to outside to form an image.

* * * * *